United States Patent [19]

Ballas, Sr.

[11] 4,124,938

[45] Nov. 14, 1978

[54] FLEXIBLE STRING CUTTING DEVICE

[75] Inventor: George C. Ballas, Sr., Houston, Tex.

[73] Assignee: Weed Eater, Inc., Houston, Tex.

[21] Appl. No.: 747,378

[22] Filed: Dec. 3, 1976

[51] Int. Cl.² .................... A01G 3/06; A01D 35/26
[52] U.S. Cl. ........................................ 30/276; 56/12.7
[58] Field of Search ................ 30/276, 347; 56/12.7, 56/295; 403/349; 51/377

[56] References Cited

U.S. PATENT DOCUMENTS

| | | | |
|---|---|---|---|
| 3,574,978 | 4/1971 | Block | 51/377 |
| 4,020,552 | 5/1977 | Mizuno | 30/276 |
| 4,024,635 | 5/1977 | Mizuno | 30/276 |
| 4,035,912 | 7/1977 | Ballas et al. | 30/276 |
| 4,047,299 | 9/1977 | Bair | 30/347 X |

Primary Examiner—Jimmy C. Peters

[57] ABSTRACT

Apparatus for cutting, trimming and edging vegetation, and the like, is provided with a rotatable disc-like head having at least one string-like cutting member removably attached thereto and replaceably extending from its periphery for cutting adjacent vegetation and the like. A metallic bearing element for enhancing the cutting life of cutting strings is provided, as well as improved means for releasably securing a spool containing spare cutting line within the head assembly.

7 Claims, 20 Drawing Figures

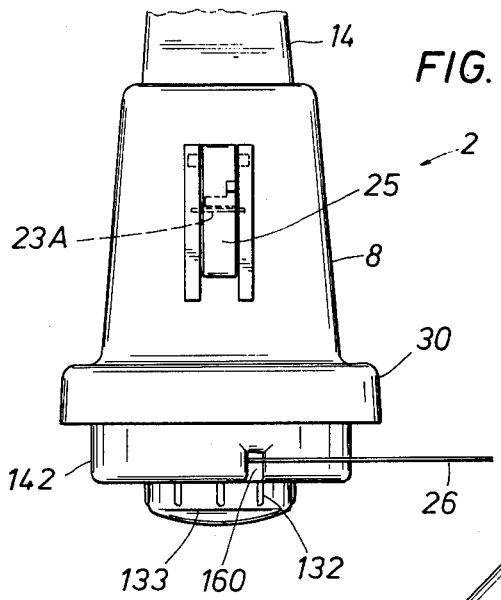
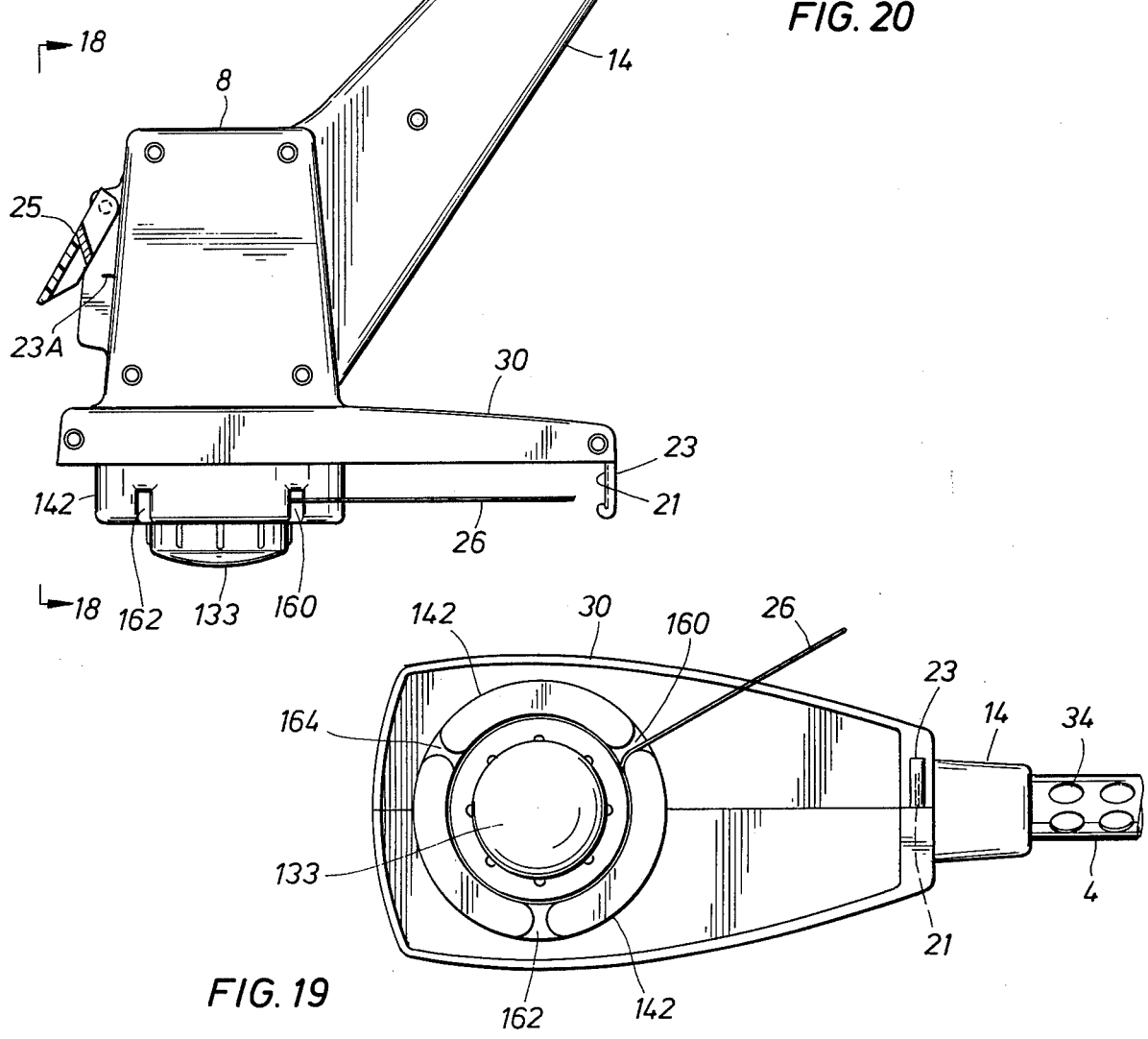
FIG. 18
FIG. 20
FIG. 19

FLEXIBLE STRING CUTTING DEVICE

BACKGROUND OF INVENTION

This invention relates to methods and apparatus for cutting vegetation and the like, and more particularly relates to improved methods and apparatus for cutting vegetation with a flexible non-metallic cord member.

It is well known to cut or mow grass, weeds and other vegetation with a moving flail-like member, and it is now well known to employ a flexible non-metallic cord member for the purpose of cutting vegetation located in places which are inaccessible to apparatus employing a rigid steel blade. In particular, the trimmer which is marketed in various forms under the trademark WEED EATER, and which is described in U.S. Pat. Nos. 3,708,967; 3,826,068; and 3,859,776; is now widely known and used for this purpose.

This invention relates to an improved cutting assembly in the form of a rotary head for a rotary edger, trimmer or the like. The preferred embodiment in the form of a portable hand-held type mowing and edging tool wherein the cutting element is safe in most uses and avoids the hazardous conditions created by prior art devices.

SUMMARY OF INVENTION

This invention is for an improved cutting assembly for a rotary mower, edger, trimmer or the like. It includes a body member arranged for rotation about an axis generally perpendicular with or normal to the cutting plane. It preferably includes one non-metallic cutting line attached to the body member at three alternate sites for rotation therewith in the cutting plane, although a pair of lines may be effective for present purposes under proper circumstances. More particularly, provision is made via metallic bearing surfaces for the reduction of friction between the cutting lines and portions of the apparatus and between adjacent portions of the cutting lines, and for higher speed and cutting efficiency.

The line is characterized by having an effective working length to diameter ratio, and of a material composition such as to render the line flexible and yielding to the extent that it is substantially incapable of causing damage or injury when impacting against persons, animals, trees, etc. Preferably, the effective working length to diameter ratio of the line is in the order of 49:1. Certain embodiments of the invention include means for detachably securing the line or lines to the body member so that the same may be replaced after wear or breakage resulting from impact of the line against fences, trees, walls, etc., as well as vegetation. Provision is also made within the body member for storing additional cutting line in the nonworking condition whereby the effective working length of the line or lines may be lengthened at desired times as the working length becomes shortened due to breakage or fraying during use thereof. Certain embodiments of the invention may have line storage means supported in the body member, which storage means are in the form of a spool which is locked from rotation, but which may be disengaged whereby additional line may be paid out to replace or replenish the effective working length of the cutting line when it becomes shortened during use. Another particularly significant feature is that the configuration of the cutting head is such as to prevent angular deformation or "kinking" of the cutting line, as will hereinafter be explained in detail.

In one particularly ideal embodiment of the present invention, a circular head member is provided which contains a single spool located concentrically therein in coaxial alignment with the motor shaft, the spool having a single strand centrally wound thereabout so as to present a free travelling end extending from the periphery of the head assembly. Alternatively, in a two exit head embodiment, a pair of two separate strands may be wound about the spool to present two ends as cutting members extending oppositely of each other from the periphery of the head assembly.

It has been discovered that when a three exit head is employed for present purposes, greatly improved balance of the cutting head is achieved when the strand is extended, as compared with two-exit heads. Consequently, in an alternative ideal embodiment of the present invention, a single strand may be wound about the spool and extended from any one of the three or more exits spaced equal distances around the periphery of the head assembly.

In addition to the various other problems of the devices of the prior art, it has also been discovered that excessive line breakage will occur from another cause not heretofore discussed. As hereinbefore explained, the subject cutting devices operate by revolving the circular cutting head at a relatively high velocity, whereby the cutting lines are caused to be more or less rigidly and radially extended from the periphery of the head. During such revolvement, however, these lines are caused to vibrate longitudinally as well as laterally.

As will hereinafter be explained and described in detail, the uncoiled or free travelling end of the cutting line tends to contact portions of the cutting head such as the walls of the peripheral apertures or "windows" in the rim of the cutting head. When the aforementioned longitudinal vibrations occur, the line tends to rub back and forth against these contact points. Although the surfaces of both the line and the walls of the cutting head are relatively quite smooth, there is considerable friction nonetheless, and therefore heat is often generated to an extent such that the cutting line tends to melt. When this occurs, the melted portion of the line may adhere to the contacted surface of the head, and thereafter break, or the melting may itself create a weakening of the line whereby it will thereafter break off at that point.

It is a feature to reduce the friction between the cutting line and any portion of the cutting device against which the cutting line is caused to rub. In a particularly suitable embodiment of the present invention, therefore, such friction is reduced by providing that the nylon cutting lines be disposed against metallic bearing surfaces preferably composed of brass or some other suitable metal or other substance.

It is another advantageous feature of the present invention to provide maximum operator convenience and ease of operation. Accordingly, in one embodiment of the present invention, means are provided whereby the present device may "ride" the ground and be tilted to any desired angle during operation, rather than be continually supported solely by an operator.

As hereinbefore discussed, use of the present device over a long period of time will result in line breakage, and therefore line must be lengthened from time to time by drawing out additional line from the storage spool within the body member. However, it will readily be apparent that the storage capabilities of the storage spool are finite and that the storage spool itself from time to time will have to be replenished with new line, or else the entire spool will have to be replaced. Consequently, it is a feature of the present invention to provide a rapid, efficient and simple means for removing the spool from the body member whereby a new spool may be employed or the original spool rewound with new line. In addition, easy access to the spool facilitates line untangling and other similar operations when necessary.

These and other features and advantages of the present invention will become apparent from the following detailed description, wherein reference is made to the figures in the accompanying drawings.

IN THE DRAWINGS

FIG. 2 is an exploded assembly drawing of one embodiment of the head and spool assembly.

FIG. 18 is a partial front view of the apparatus depicted in FIG. 1, with the head depicted in FIG. 11.

FIG. 19 is a bottom view of the apparatus depicted in FIGS. 1 - 18.

FIG. 20 is a partial side view of an alternate embodiment of the apparatus depicted in FIG. 1, with the head depicted in FIG. 11.

DETAILED DESCRIPTION

Figure 1:
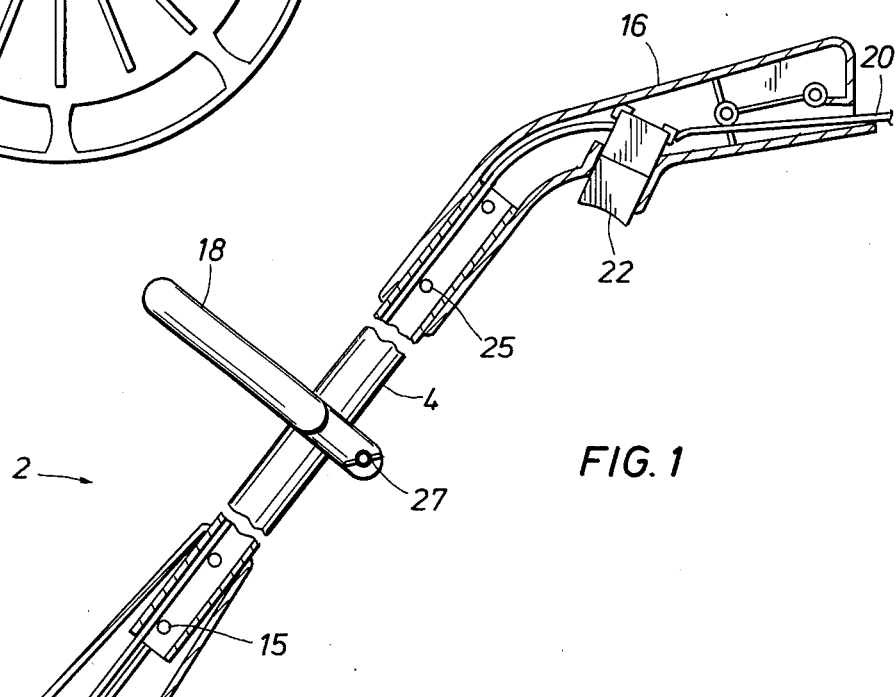
FIG. 1 is a pictorial side view, partly in cross-section, of the entire cutting apparatus, wherein the mechanical features and configuration of the apparatus are set forth in detail.

Referring now to FIG. 1, a portable type mowing and edging device generally designated by the numeral 2 is shown, and which is of the type preferred for lighter tasks in residential-size plots or areas, and the like, where electrical power is immediately and conveniently available to the operator. Accordingly, the apparatus may be composed of a tubular member 4 having a casing 8 containing electric motor 10 mounted at one end, which motor drives a string cutting head 42. The tubular member 4 is removably attached to and supports casing 8 by screws 15 insertable in shank 14. Such a device 2 is portable and is hand held and manipulated by an operator by means of trigger handle 16 and intermediate handle 18. Handle 16 is attached to tubular member 4 by screws 25, whereas handle 18 is attached to tubular member 4 by an easily adjustable wing-nut assembly 27. Power may be applied to the motor 10 through a conventional electrical-type insulated cord or conductor 20, having an appropriate plug at one end (not shown), and having its other end passed through the tubular member 4 for connection with the motor 10. An appropriate ON-OFF switch or trigger 22 may conveniently be located adjacent the handle 16 at the upper end of the tubular member 4, for interconnection with the conductor 20 and motor 10. The cutting plane of the cutting string 26 may be easily arranged in either a horizontal or vertical position or tilted to any angle, to cut along sidewalks, around trees and rocks, and along fences and the like, where it is either unsafe or difficult to cut with conventional apparatus, merely by turning and manipulating handles 16 and 18.

The single string circular cutting head 42 is rotated by the shaft 36 of the electrical motor 10 mounted within casing 8. The cutting head may further be seen to include cutting strand 26 extending laterally from the cutting head 42 through either aperture 60 or 62 (FIG. 2) of the suitable configuration, a distance which is a function of the present invention as will hereinafter be explained. As further indicated the casing may have a circular flange portion or interference member 30 for preventing the cutting head 42 from being brought into injurious contact with a wall or tree during its rotation by motor 10. Shield member 30 may have a cutting blade 21 suspended therefrom perpendicular to the cutting path by means of holder 23 at the extremity of shield 30 furthest from head 42. Cutting blade 21 acts as a line length adjuster by automatically trimming off excess line lengths when the head 42 is rotated sufficiently rapidly to cause string 26 to stand out rigidly from the cutting head 42 and pass across the cutting blade 21 (see FIGS. 1 and 19). An additional line trimming blade 23A is located on the outside front portion of casing 8 and includes a hinged line trimmer lever 25. This trimming blade 23A may be used to trim line for any reason while the device 2 is not in operation.

When the motor 10 is inactivated and the rotary head 42 is in a static condition, the cutting strand line 26 will tend to flexibly dangle from one of the equally spaced-apart windows 60 and 62 (FIG. 2) to the extent permitted by inherent characteristics of line 26. When the cutting head 42 is rotated at normal operating velocities, however, the line 26 will tend to stand out rigidly (but also flexibly and yieldably) from the periphery of the cutting head 42 as indicated in FIG. 1. As will hereinafter be explained in greater detail, a spool containing surplus line is removably insertable into cutting head 42.

An electric motor 10 operates in an optimum manner when the air around it is allowed to be circulated or otherwise cooled. The hollow casing 8 effectively prevents air from freely circulating around motor 10. Therefore, a plurality of upstanding fins 28 may be located on the top of cutting head 42 and extended radially outward from the axis thereof to provide forced circulation of air about motor 10 when motor 10 rotates head 42. Rapid rotation of head 42, and hence of fins 28, causes said fins to create a low pressure zone within casing 8, whereby air is drawn from the atmosphere through openings 34 in shank 14 and passed into casing 8 and around the motor 10, and expelled through the space 38 between flange 30 and cutting head 42. This circulation of air sufficiently cools motor 10 to provide maximum efficiency and minimal ambient heat rise. In an alternate embodiment of the present invention (FIG. 20), the openings 34 may be located in tubular member 4 rather than shank 14 to further remove the openings 34 from the cutting area so that cut grass or other debris flung up by line 26 is not likely to enter openings 34 along with the air. In this alternate embodiment, air is introduced into openings 34 in tubular member 4 and passed therefrom into shank 14 and casing 8.

The cutting line 26 may be composed of a variety of suitable materials as, for example, an elastoplastic extrusion which has been stretched to align the molecules axially. An example of such line is a nylon monofilament of the type commonly used for fishing line. However, other lines may be used, as for example, yarn, cord, rope, twine, braided line, or monofilament, whether described as elastoplastic, elastomeric, natural fiber, or synthetic fiber, and whether compounded of several materials. Nevertheless, there are certain parameters within which the lines must fall in order to be effective.

The cutting line 26 should preferably have sufficient fatigue, abrasion, impact resistance, and tensile strength to allow a reasonable service life, and should have as small a diameter as is consistent with the foregoing parameters so that the sharpest cutting edge is provided for effecting cutting of the grass, weeds, or the like. The line 26 should further preferably be as light-weight as possible, so that when the line shears or breaks during use and pieces are thrown from the cutting head 42, such pieces will travel only a limited distance and will strike persons or other objects in the immediate vicinity with little or no appreciable impact.

Cutting may be achieved with line 26 formed of a metal material, and such lines may have a greater tensile strength than if formed of nylon or the like. Metallic lines are more subject to breakage because of fatigue, however, and the relatively greater mass of a piece of metal cutting line will cause it to travel like a projectile for a considerable distance if breakage occurs. In addition to this dangerous feature, the fact that the greater mass of a metallic line requires a larger, heavier motor 10 of greater power makes the use of metallic line 26 undesirable for present purposes. On the other hand, the relatively small mass of a line formed, for example, of an extruded nylon monofilament, creates complex design problems which must be effectively solved to achieve effective cutting of lush vegetation, and this will become even more apparent when it is recognized that only the last one full inch or so of the line 26 actually impacts against the vegetation sought to be cut.

In view of the above, and in further regard to the theory of the invention, it should be understood that in a rotating system as above described, the top impact has been found to be a function of the mass of the tip of the flexible line member 26 and the tip velocity thereof. This tip impact parameter has been found useful in determining the effectiveness of the cut produced when using the disclosed type cutting device. Thus, it has been found that the higher the tip impact, the better and more effective the cut. Conversely, as the tip impact decreases, due to variation of one of tip mass and tip velocity, the quality and effectiveness of the cut likewise is lowered.

Referring now to FIGS. 1 - 10, it may be seen that the lower end of the drive shaft 36 extends downwardly through head 42 from motor 10 and is arranged for threading engagement at its lower end 35 with keyed retainer member 37 in threaded aperture 39. Drive shaft 36 inserts tightly into aperture 39 in head 42 and retains its relationship with head 42 by means of its flattened portion 31, which is insertable into head 42. Rotation of drive shaft 36 by motor 10 causes head 42 to also rotate, thereby extending the string to perform a cutting function.

Spool 44 contains spare cutting line 46 therein, which is arranged for paying out at predetermined times and at predetermined lengths to vary the effective working length of the cutting line 26. Spool 44 is composed of a bottom wall 48 and a top wall 50 spaced a predetermined equidistance by hub 52. Interior and on the top side of hub 52 is a centrally located opening 57 wherein two annular locking tab means or protuberances 49 and 51 spaced diametrically opposite each other and extending partly around the interior of spool 44 are arranged for releasable engagement with two annular locking tab means or protuberances 43 and 45 on retainer member 37. Removal of spool 44 from head 42 may be accomplished by rotating spool 44 by means of grip element 33 so that locking protuberances 49 and 51 are rotated out of locking engagement with protuberances 43 and 45 on retainer member 37. The two sets of annular protuberances 49 and 51, and 43 and 45 cooperate with the central opening 57 to form a central guide means for coaxially securing the spool 44 in the head 42. Removal of spool 44 from head 42 enables a fresh spool to be inserted into head 42, or spool 44 may be rewound with replacement line or the like.

Window insert member 76, composed of arms 76A and 76B and inserts 77A and 77B, is releasably retained within head 42 by retainer member 37 which is insertable through aperture 79. Inserts 77A and 77B correspond to and insert into window apertures 60 and 62 in head 42, and enhance cutting line life as will be more fully described hereinafter.

As previously described, head 42 is rotated by shaft 36 of motor 10 inserted into aperture 39 of head 42. The spool 44 with cutting line 26 wound thereon is contained within head 42 between two semicircular housing walls 41A and 41B, each having inner walls 202 and outer walls 200. The head 42 is provided with two window apertures 60 and 62 wherefrom a cutting string may protrude, the said two apertures each having a curvilinear bearing surface 61.

Figure 4:
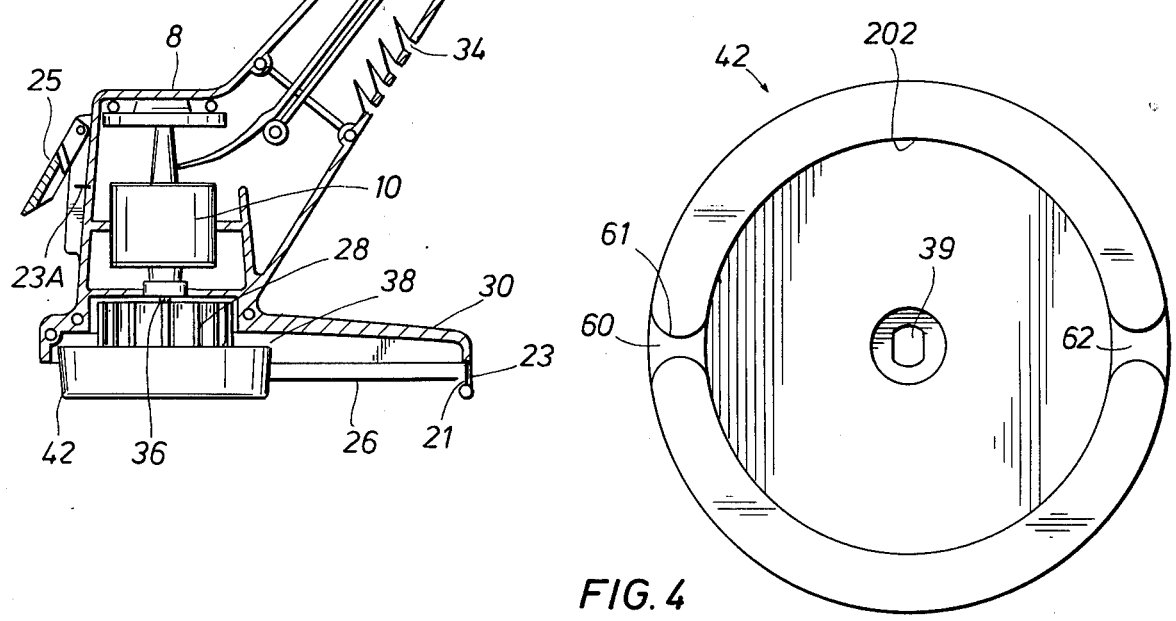
FIG. 4 is a bottom view of the head depicted in FIG. 2.

It may be clearly seen in FIGS. 1, 2 and 4 that in one embodiment a single line 26 extends from the body of the cutting head 42 through one of the two window apertures 60 and 62. In the embodiment therein depicted, one end of the line 26 is inserted through aperture 55 in the spool hub 52, and then knotted together to prevent disengagement therefrom. The line 26 is then preferably wound about the spool 44, oppositely of the direction of rotation of spool 44 and head 42, and then extended through one of respective window apertures 60 and 62, as hereinbefore stated.

The line 26 may be unwound and paid out from the spool 44 without removing the spool 44 from the head 42, by drawing it out of one of respective window apertures 60 and 62 and simply pulling down on the line 26 to the next window aperture, since the bottom wall 48 of the spool 44 is stiff but resilient. It is to be noted, that a spool modified as hereinafter described for use with the embodiment of the cutting head depicted in FIGS. 12 and 13, may be similarly wound and unwound with cutting line.

In an alternate embodiment of the present invention, a pair of cutting lines 26 may be provided but no additional structure is required to provide this dual cutting line feature. For example and in light of FIGS. 2 and 5, the empty spool 44 is wound as above. However, in the dual cutting line embodiment, the line 26 is first doubled along its length thereby providing two free ends. That portion of the line that is doubled is inserted through aperture 55 and knotted as above. The doubled line is then wound onto the spool until the two free traveling ends are reached. Each free end of the line 26 is then extended through one of the respective window apertures 60 and 62, thus providing a head assembly 42 including a pair of cutting strands 26. To extend either of the lines, it is then merely required to pull down on the line until that line reaches the next window aperture. Since wall 48 is resilient, the line can be pulled along the space defined by wall 48 and the inner periphery of head 42 until it reaches the next window aperture. The other line may be extended or paid out in similar fashion.

It has further been determined that the extended length of the cutting line is also a direct function of the size of the cutting head, although the precise explanation for this is not immediately apparent. In any event, it can be stated that this provides that the cutting line should have a free traveling or unsupported length of not substantially less than 0.50 times the diameter of the cutting head, nor substantially more than 2.2 times such diameter, and this appears to be especially significant in the operation of the embodiment of the invention depicted herein.

As hereinbefore explained, it is a feature of the present invention to provide against excessive string or line breakage by substantially reducing friction between the surface of the cutting line 26 and other objects such as bearing portions of the rotary head, or adjacent surfaces of the cutting line itself. Referring now to FIG. 2, the two window apertures 60 and 62 are each composed of a pair of curvilinear and spaced apart sidewalls 61. In this embodiment of the present invention, the cutting line 26 is composed of a coiled portion 46 (FIG. 5) wound about the spool 44, and a free travelling end portion extending along a tangent thereto outwardly through one of the respective window apertures 60 and 62. Accordingly, the line tends to abut the trailing one of the pair of sidewalls 61 composing the respective one of the two windows 60 and 62, rather than the sidwall 61 which leads the line as it is carried arcuately about by rotation of the cutting head 42.

As also hereinbefore explained, the cutting line 26 tends to vibrate longitudinally as the cutting head 42 is rotated, and thus to oscillate laterally against the trailing sidewall 61 of one of the windows 60 and 62 in a manner to generate sufficient localized heat to at least partially melt the cutting line at a point along its length where it contacts the said trailing sidewall 61. It has been beneficial, therefore, to provide these trailing sidewalls 61 with bearing inserts 77A and 77B, preferably formed of a material which has a reduced tendency to develop friction from engagement with the vibrating cutting line, and further preferably having a smooth or polished surface for carrying the cutting line. These inserts 77A and 77B may be formed of a variety of different materials which are suitable for such purposes, but it has been found that a polished metal such as brass or stainless steel is especially suitable. For convenience, as depicted in FIG. 2, the individual inserts 77A and 77B may be connected by arms 76A and 76B to insert member 76 so as to form one integral piece.

It should be noted, of course, that if the rotary body 42 is itself formed of brass or stainless steel or the like, or if at least that portion of the rotary head 42 which constitutes each trailing sidewall 61 is formed of such material, then there is no need for the insert member 76 as a separate component in the cutting head 42. For various reasons hereinafter described in greater detail, however, it is highly desirable to form the rotary head 42 and other major components out of a high impact plastic such as nylon or the like, and although such a material may be provided with sidewalls 61 having a smooth high gloss finish or surface, a nylon-to-nylon vibratory engagement tends nonetheless to develop heat to an extent much above the melting point of nylon. Thus, it is preferable to form the rotary head 42 of plastic and to eliminate nylon-to-nylon contact by providing metal bearing inserts 77A and 77B as heretofore explained.

Figure 5:
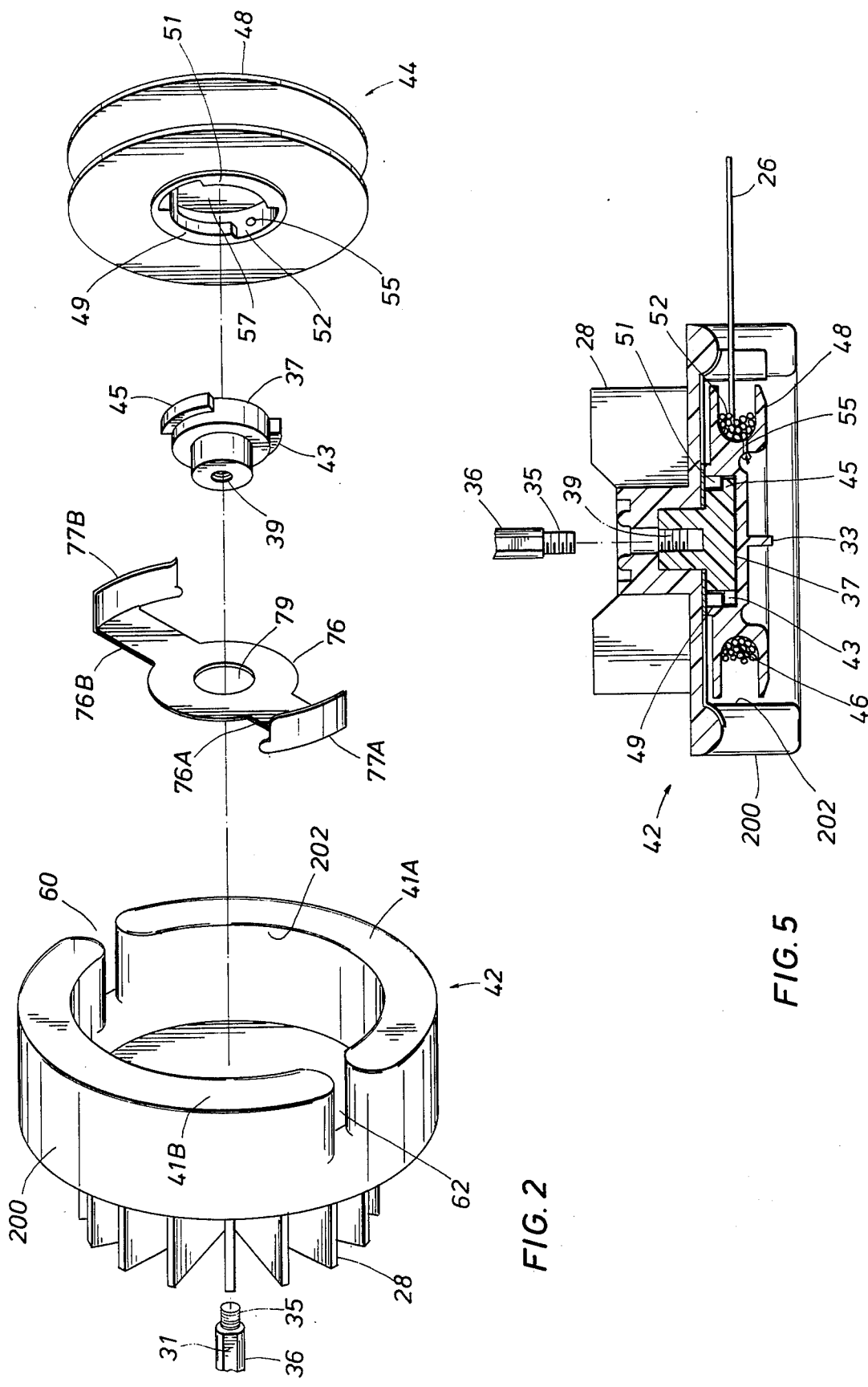
FIG. 5 is a cross-sectional view of the head assembly depicted in FIG. 2 in a static or nonrotating position showing the cutting string mounted therein.
Figure 6:
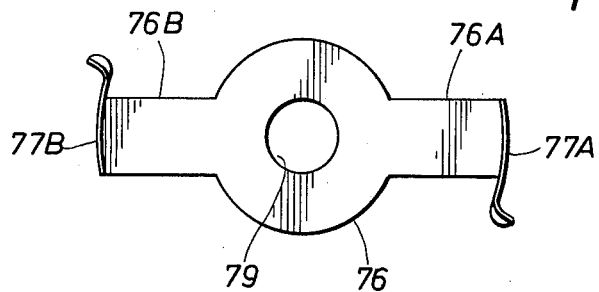
FIG. 6 is a bottom view of the insert depicted in FIG. 2.
Figure 7:
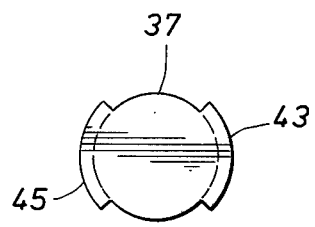
FIG. 7 is a bottom view of the locking clip depicted in FIG. 2.
Figure 8:
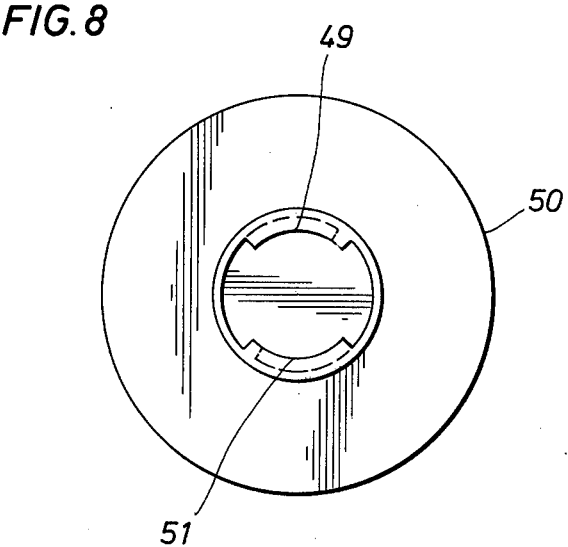
FIG. 8 is a top view of the spool depicted in FIG. 2.
Figure 9:
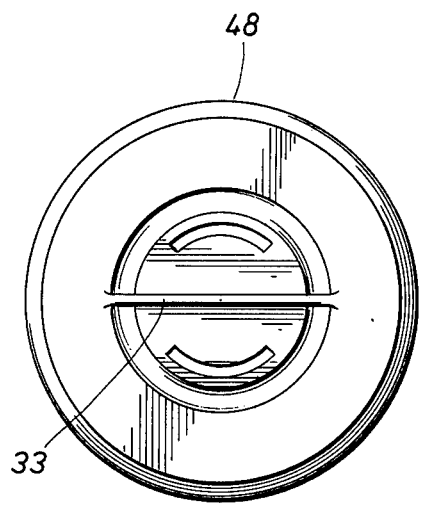
FIG. 9 is a bottom view of the spool depicted in FIG. 2.
Figure 10:
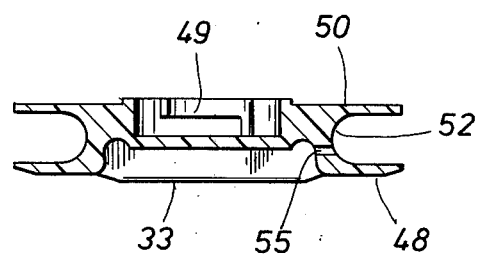
FIG. 10 is a side cross-sectional view of the spool depicted in FIG. 2.

It has been determined through usage of the present invention that wherever metal-to-plastic contact can be established at such points of vibratory engagement, reduction or dissipation of unwanted heat is usually if not always sufficient to eliminate melting or softening of the cutting line in the manner hereinbefore described. This, of course, is not a practical remedy in those instances wherein vibratory engagement occurs at places such as between adjacent windings of the cutting line 46 (FIG. 5). On the other hand, application of a coating of suitable lubricant to the cutting line 46 will not only overcome this problem completely but will also further reduce frictional engagement and insulate those points wherein metal-to-plastic contact has also been achieved by means of the afore-mentioned inserts 77A and 77B or the equivalent.

As hereinbefore stated, any of several materials may be employed as a heat insulating lubricant for this purpose, and as also previously stated, common petroleum jelly has been found to be entirely satisfactory. Any of many other substances of suitable viscosity may be employed as a lubricant, however, provided such lubricant will adhere to the surface of the cutting line 46 whereby the entire line is adequately coated at all times.

Referring now to FIGS. 11 – 17, an alternate embodiment of the present invention is shown, similar to that depicted in FIGS. 1 – 10. As hereinbefore described with regard to head 42, the single string circular cutting head 142 is rotated by the shaft 136 of motor 10. The lower end of drive shaft 136 is arranged for threading engagement with retainer member 137 in aperture 135. Drive shaft 136 inserts tightly into aperture 131A in head 142 and retains its relationship with head 142 by means of its flattened portion 131, as hereinbefore discussed.

Spool 144, similar to spool 44 in FIG. 2, contains spare cutting line 146 therein which is inserted into aperture 155 and wound onto and payed out from hub 152 as hereinbefore described in detail. Spool 144 also has a bottom wall 148 and top wall 150. Hub 152 extends beyond bottom wall 148 to form glide ball 133. Interior of hub 152 is a centrally located cavity 157 wherein three annular locking tab means or protuberances 151A, 151B and 151C, equally spaced about the circumference of cavity 157, are arranged for releasable engagement with three annular locking tab means or protuberances 149A, 149B, and 149C within head 142. Removal of spool 144 from head 142 may be accomplished by rotating spool 144 by means of glide ball 133, the external surface of which may be provided with equally spaced-apart vertical lineal protrusions 132 to insure a better grip for easier removal, so that locking protuberances 151A, 151B and 151C are rotated out of locking engagement with protuberances 149A, 149B and 149C within head 142. The two sets of annular protuberances 151A, 151B and 151C, and 149A, 149B and 149C, cooperate with the centrally located cavity 157 to form a central guide means for coaxially securing the spool 144 in the hub 152.

Window insert member 176, composed of arms 176A, 176B and 176C and inserts 177A, 177B and 177C, is releasably retained within head 142 by spool 144. Aperture 179 permits retainer member 137 to pass therethrough and engage drive shaft 136. Inserts 177A, 177B and 177C correspond to and insert into window apertures 160, 162 and 164 in head 142, and enhance cutting line life as has previously been explained in detail.

Head 142 is similar to head 42 previously depicted and described. The spool 144 with cutting line 146 wound thereon is contained within head 142 between three semicircular housing walls 141A, 141B and 141C, each having inner walls 202 and outer walls 200. The head 142 is provided with three window apertures 160, 162 and 164 wherefrom a cutting string may protrude, the said three apertures each having a curvilinear bearing surface 161.

Figures 11, 16:
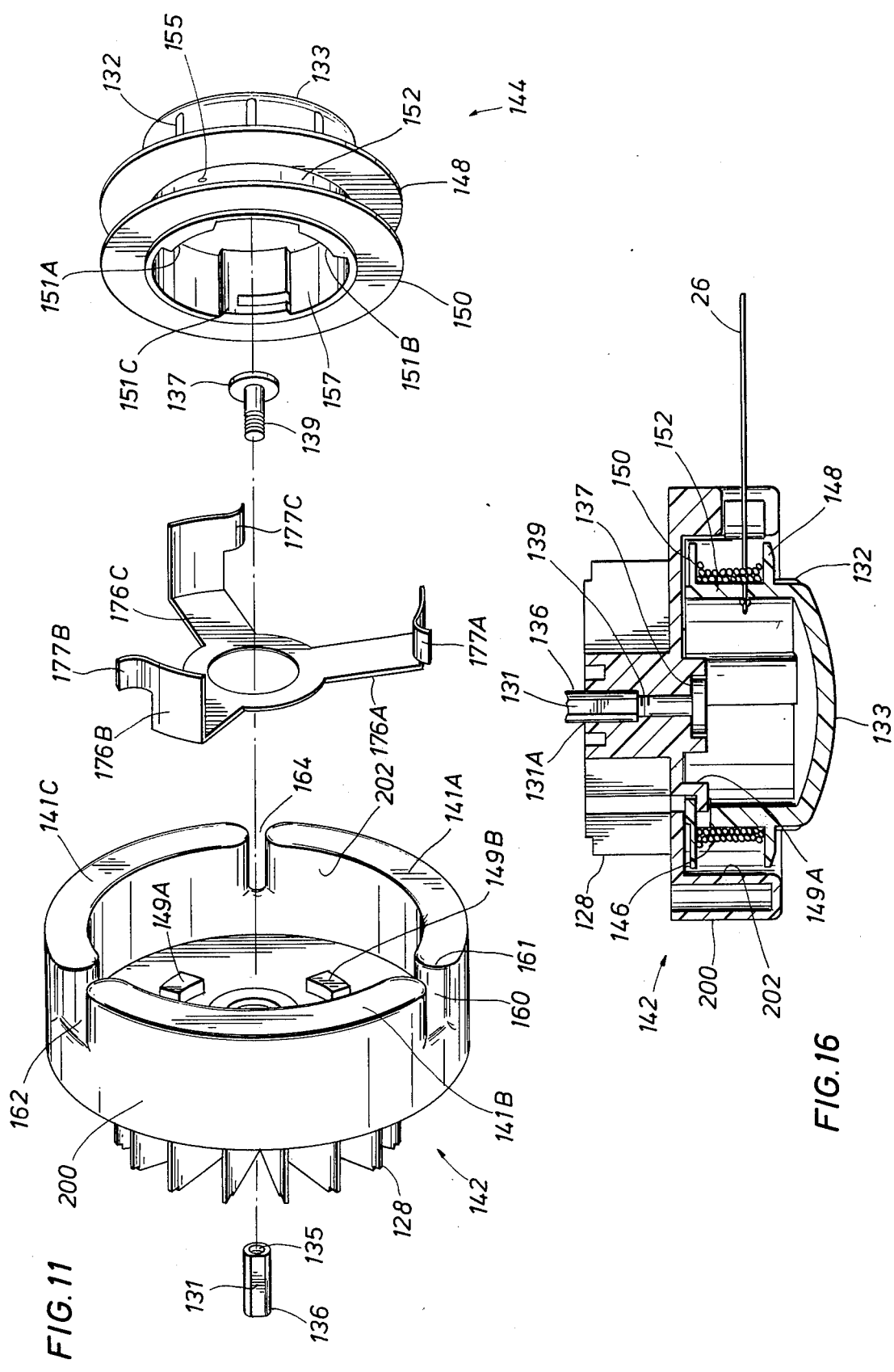
FIG. 11 is an exploded assembly drawing of an alternate embodiment of the head and spool assembly depicted in FIG. 2.
FIG. 16 is a cross-sectional view of the alternate head assembly depicted in FIG. 11 in a static or nonrotating position showing the cutting string mounted therein.
Figure 12:
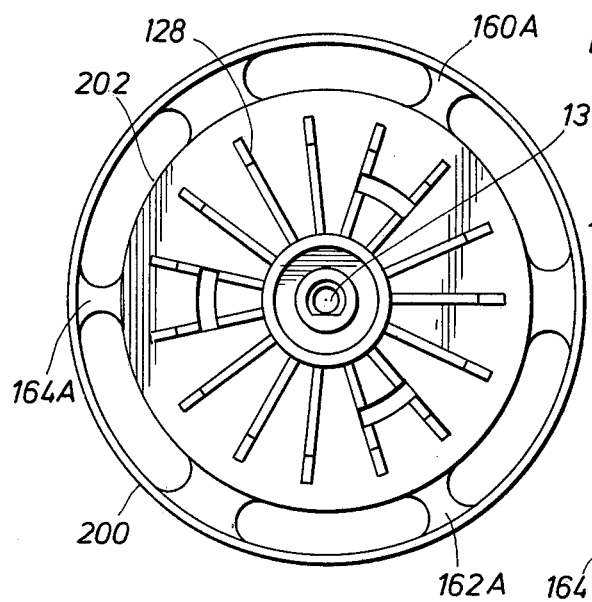
FIG. 12 is a top view of the head depicted in FIG. 11.
Figure 13:
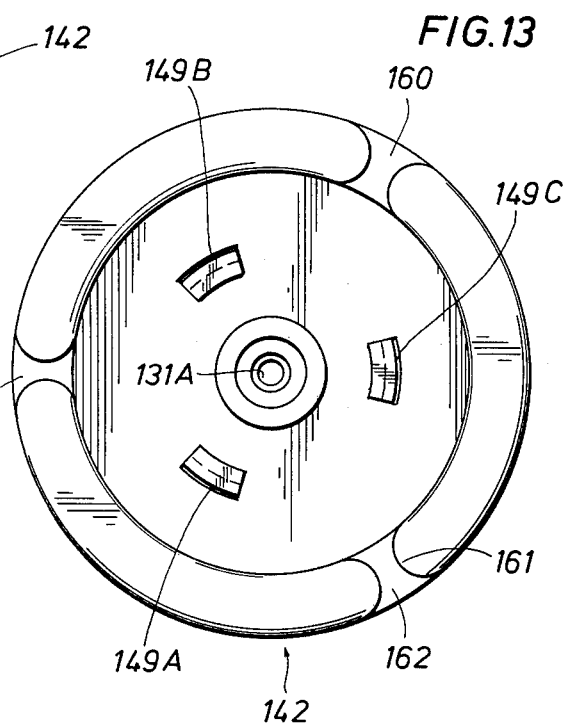
FIG. 13 is a bottom view of the head depicted in FIG. 11.
Figure 17:
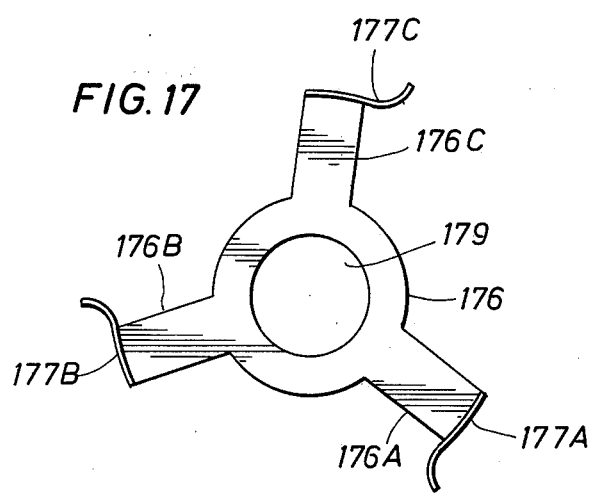
FIG. 17 is a bottom view of the insert depicted in FIG. 11.
Figure 15:
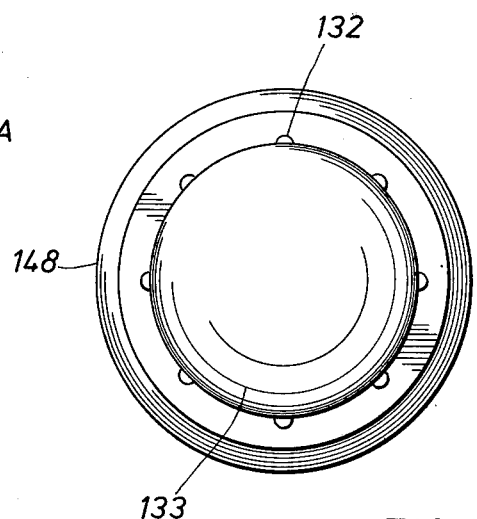
FIG. 15 is a bottom view of the spool depicted in FIG. 11.
Figure 14:
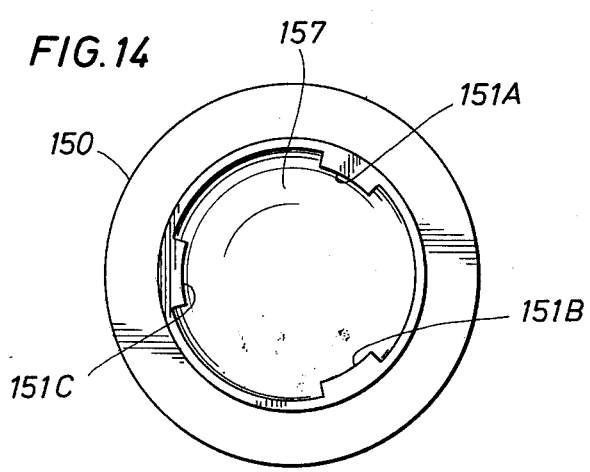
FIG. 14 is a top view of the spool depicted in FIG. 11.

With reference to FIGS. 12 and 13, a further feature of the present invention includes means whereby the three exit head embodiment may be balanced rotationally so as to not transmit unwanted vibrations to the motor shaft 136. Thus, to provide a smooth running and rotationally balanced head assembly 142, it is necessary to offset the weight attributable to the line 26 extending outwardly of one of window apertures 160, 162, 164. If, for example, as depicted in FIG. 11, a single cutting line passes outwardly of the periphery of head 142 via aperture 160, the mass of the peripherally extending portion of the line 26 will unbalance the head 142 in a rotational sense. Thus, the head at point 160 will include a mass that is not offset by a corresponding mass at a location diametrically opposite point 160. To overcome this deficiency, and with reference to FIG. 12, there will be seen three balancing ribs 160A, 162A, 164A. Each balancing rib is located diametrically opposite its corresponding window aperture. Thus, for example, balancing rib 164A balances window aperture 164. When the head 142 is assembled for grass cutting operation and includes therein a full spool of line 26, the line is inserted into one of apertures 160, 162 and 164. The line extends outwardly of one of these apertures and acts as a flail to cut vegetation. Normally, a 3.2 inch length of line 26 is used for cutting operations. However, as noted above, it is this 3.2 inch section of line that causes head 142 to rotate in an unbalanced condition. It is therefore the function of the balancing ribs to offset this mass of the 3.2 inch flail. This is accomplished by constructing the balancing ribs to be of an amount of material equal in weight to the mass of the extended 3.2 inch flail section of line member 26. This weight of the balancing ribs will vary from unit to unit depending, of course, upon variable factors such as line diameter, line density, length of the flail portion of the line, and the particular materials of construction of the head 142, cutting line 26, and balancing ribs 160A, 162A, and 164A. Sufficient to say, however, that the balancing ribs have a mass equal or substantially equal to the mass of the extended cutting flail portion of line 26.

Figure 3:
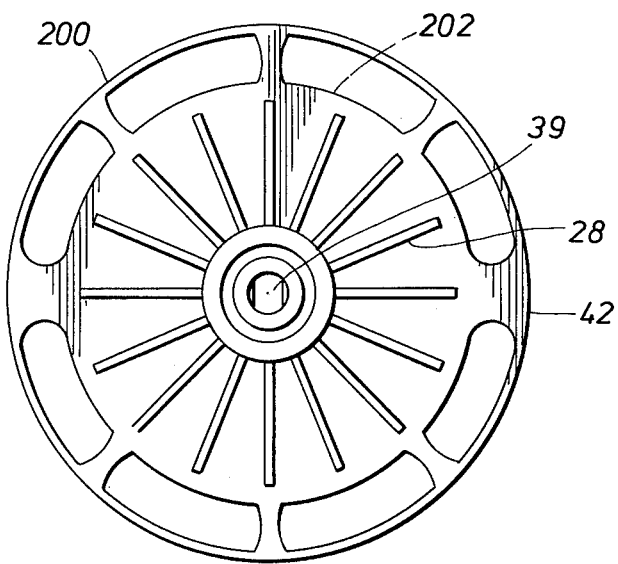
FIG. 3 is a top view of the head depicted in FIG. 2.

As hereinbefore noted, the curvilinear line bearing surface 161 of each of window apertures 160, 162, 164, is preferably formed by constructing the head member 142 of a pair of spaced apart walls 200 and 202 seen in FIGS. 12 and 13. Thus, wall 200 defines the outer periphery of head member 142 whereas wall 202 defines the inner periphery thereof. It will be seen that in FIG. 12, the balancing ribs 160A, 162A and 164A, are placed between walls 200 and 202 and are positioned radially with respect to the axis of rotation of the head or housing member 142. As illustrated in FIG. 12, the space between walls 200 and 202 is otherwise open. It should be noted, that the two exit head embodiment of FIGS. 3 and 4 is likewise of double-walled construction as hereinbefore explained with reference to FIGS. 12 and 13.

Referring now to FIGS. 1 and 18, the device 2 is depicted in the normal horizontal cutting attitude. In actual practice, much of the grass or weeds to be cut will be close to the ground, and therefore the device 2 will have to be tilted slightly to cause the cutting string 26 to cut close to the ground. In this regard, the alternate embodiment employing glide ball 133 (FIG. 18) may be used to allow the unit to "ride" the ground as the cutting operation takes place, and the convex outer lower shape of the glide ball 133 enables an operator to conveniently tilt the unit 2 to any desired angle. It is to be noted that regardless of which embodiment of the invention is used, handles 16 and 18 may be manipulated to result in horizontal or angular deployment of the cutting head. It is also to be noted that depending on the size and weight of electric motor 10 used and the size and weight of other materials employed in the construction of device 2, handle 18 may be deleted altogether and handle 16 alone used to manipulate the device 2.

It will thus be apparent, that this invention provides the art with a cutting device which can quickly, easily, and efficiently cut grass, weeds, and the like; over, under, around, and between rocks, culverts, and the like; and can cut around and between trees, posts, bushes, buildings, and other stationary objects, or the like. Further, this apparatus will be particularly safe for both the operator and others in the vicinity, in that the hazardous conditions present when prior art devices are used have been essentially eliminated. By making the apparatus available in a portable embodiment, the cutting plane can be effected in any direction so as to accommodate both cutting and trimming operations as heretofore described, thereby eliminating the need for manual labor in certain difficult cutting operations.

The apparatus of this invention can also be used successfully in yard trimming and cleaning operations where there is considerable debris, such as bottles, cans, papers, wood, wire and the like, without creating a dangerous condition in that the cutting elements of this device do not create missiles of such trash. Because of the nature of the cutting element of this invention, such objects are not thrown, but rather the cutting string acts in a resilient fashion, so as not to impart sufficient force to such objects to become missiles; or if they are thrown, they are projected at only a very low velocity as compared with cutting devices heretofore in use. Experience has shown that in operating an apparatus of this device with line of the type described, the cutting line may accidentally come in comtact with the operator's shoes, articles of clothing, or the like, without serious injury as would be the case with prior art devices.

It will be apparent from the foregoing that many other variations and modifications may be made in the structures and methods described herein without departing substantially from the essential concept of the present invention. Accordingly, it should be clearly understood that the forms of the invention described herein and depicted in the accompanying drawings are exemplary only and are not intended as limitations in the scope of the present invention.

What is claimed is:

1. Apparatus for cutting vegetation and like, comprising:
    disc-like head means rotatable about a rotational axis in a cutting plane and having a concentrically located storage portion for spool means and a peripherally located support wall portion having curvilinear bearing surfaces and an odd number of at least three peripheral apertures spaced at equal angular displacements on said head means and said head means having a distributed mass symetrically disposed about the rotational axis,
    driving means for rotating said head means in said cutting plane.
    a flexible non-metallic line member having a coiled portion in said storage portion of said head means and further having an uncoiled portion extending from said coiled portion into said cutting plane to and through one of said peripheral apertures and further continuing radially outward from the periphery of said head means,
    circular spool means insertable axially against an abutment surface in said storage portion of said head means and holding said coiled portion of said line member,
    metallic bearing elements including portions in abutting relationship to the curvilinear bearing surfaces of each of said peripheral apertures,
    locking means for releasably securing said spool means within said head means against unintended axial and radial displacements, and
    said metallic bearing elements are unitary and include a section extending generally parallel to said cutting plane.

2. Apparatus for cutting vegetation and the like, comprising:
    disc-like means rotatable about a rotational axis in a cutting plane and having a concentrically located open-ended storage portion for spool means and a peripherally located support portion having curvilinear bearing surfaces defining one or more peripheral apertures,
    driving means for rotating said head means in said cutting plane,
    a flexible non-metallic line member having a coiled portion in said storage portion of said head means and further having an uncoiled portion extending from said coiled portion into said cutting plane to and through at least one of said peripheral apertures and further continuing radially outward from the periphery of said head means,
    circular spool means insertable axially against an abutment surface in said storage portion of said head means through the open end and holding said coiled portion of said cutting line, said spool means including first tab means associated therewith,
    second tab means on said head means in said storage portion and cooperating in angular interfitting with said first tab means to lock said spool means in said storage portion of said head means,
    metallic bearing elements including portions in abutting relationship to the curvilinear bearing surfaces of each of said peripheral apertures,
    central guide means on said spool means and head means for positioning said spool means coaxially in said head means and with said first tab means in angular alignment with said second tab means,
    said spool means rotated in one direction a partial turn about the rotational axis relative to said head means to interfit said second tab means and said first tab means whereby said spool means is locked within said head means against unintended axial and radial displacements but reverse rotation of said spool means over the partial turn releases said spool means for ready axial removal from said head means, and
    said spool means carrying axial ridge surfaces adapted to form finger grips to facilitate ready installation and removal of said spool means within said head means.

3. The apparatus described in claim 2 wherein said head means includes a plurality of upstanding and radially extending fin members on one face and on opposite face thereon includes a glide ball member having a convex surface adapted to contact vegetation when said apparatus is moved therealong.

4. The apparatus of claim 2 wherein one face of said head means includes a glide ball member integrally carried by said spool means, said glide ball member having a convex surface adapted to contact the vegetation when said apparatus is moved therealong, and said finger grips provided upon said glide ball member by a plurality of lineal projections.

5. The apparatus of claim 2 wherein said spool means has a central tubular hub carrying spaced apart planar flanges with circular peripheries, said hub at a first end carrying a circular ridge forming an abutment surface, and at a second end thereof, integrally carrying a glide ball member having a convex surface adapted to contact the vegetation when said apparatus is moved therealong, and said first tab means positioned on said central tubular hub adjacent said first end thereof.

6. Apparatus for cutting vegetation and the like, comprising:
    disc-like head means rotatable about a rotational axis in a cutting plane and having a concentrically located storage portion for spool means and a peripherally located support wall portion having curvilinear bearing surfaces and an odd number of at least three peripheral apertures spaced at equal angular displacements on said head means between substantially identical balancing ribs and said head means having a distributed mass symetrically disposed about the rotational axis,
    driving means for rotating said head means in said cutting plane,
    a flexible non-metallic line member having a coiled portion in said storage portion of said head means and further having a single uncoiled portion extending from said coiled portion into said cutting plane to and through one of said peripheral apertures and further continuing radially outward from the periphery of said head means, said balancing ribs diametrically opposite to each aperture provided with a mass substantially equal to the mass of the cutting line extending from said head means into the cutting plane, circular spool means insertable axially against an abutment surface in said storage portion of said head means and holding said coiled portion of said line member in said cutting plane, metallic bearing elements including portions in abutting relationship to the curvilinear bearing surfaces of each of said peripheral apertures, and locking means for releasably securing said spool means within said head means against unintended axial and radial displacements.

7. Apparatus for cutting vegetation and the like, comprising:

head means rotatable about a rotational axis in a cutting plane and having a concentrically located storage portion for spool means and a peripherally located cylindrical support wall portion provided with an odd number of at least three substantially identical peripheral apertures spaced at equal angular displacements on said head means between substantially identical balancing ribs, a flexible non-metallic line member having a coiled portion in said storage portion of said head means and further having an uncoiled portion extending from said coiled portion in said cutting plane to and through one of said peripheral apertures and further continuing radially outward from the periphery of said head means, said apertures provided with bearing surfaces adapted to support said flexible non-metallic line member extending therethrough during rotation of said head means with said line member extended radially into the cutting plane, each of said balancing ribs diametrically opposite to each aperture provided with a distributed mass substantially equal to the mass of the cutting line extending from said head means into the cutting plane whereby said head means during rotation is substantially balanced rotationally for smooth running with the uncoiled portion of said cutting member extending into the cutting plane, circular spool means insertable axially against an abutment surface in said storage portion of said head means and holding said coiled portion of said line member, and locking means including angularly interfitted tab means for releasably securing said spool means within said head means against unintended axial and radial displacements during rotation of said head means in the cutting plane.

* * * * *